United States Patent
Kowalski et al.

(10) Patent No.: US 7,564,340 B2
(45) Date of Patent: Jul. 21, 2009

(54) RFID-UHF INTEGRATED CIRCUIT

(75) Inventors: Jacek Kowalski, Aix en Provence (FR); Didier Serra, Septeme les Vallons (FR); Bruno Charrat, Aix en Provence (FR)

(73) Assignee: Inside Contactless, Aix en Provence Cedex (FR)

( * ) Notice: Subject to any disclaimer, the term of this patent is extended or adjusted under 35 U.S.C. 154(b) by 821 days.

(21) Appl. No.: 11/101,805

(22) Filed: Apr. 8, 2005

(65) Prior Publication Data

US 2005/0186904 A1 Aug. 25, 2005

Related U.S. Application Data

(63) Continuation of application No. PCT/FR03/02938, filed on Oct. 7, 2003.

(30) Foreign Application Priority Data

Oct. 9, 2002 (FR) .................................. 02 12505

(51) Int. Cl.
*H04Q 5/22* (2006.01)
(52) U.S. Cl. ..................... 340/10.1; 340/10.3; 340/5.61; 340/5.64; 340/10.2; 340/10.33; 340/10.5
(58) Field of Classification Search ................ 340/10.1, 340/825.69, 825.72, 10.2, 10.5
See application file for complete search history.

(56) References Cited

U.S. PATENT DOCUMENTS

| 5,376,943 | A | 12/1994 | Blunden et al. |
| 5,453,747 | A | 9/1995 | D'Hont et al. |
| 6,282,407 | B1 * | 8/2001 | Vega et al. .................. 455/41.1 |
| 6,362,738 | B1 * | 3/2002 | Vega ........................ 340/572.1 |
| 7,091,860 | B2 * | 8/2006 | Martinez de Velasco Cortina et al. ........................ 340/572.1 |
| 2003/0174048 | A1 * | 9/2003 | McCorkle ................. 340/10.34 |

* cited by examiner

*Primary Examiner*—Vernal U Brown
(74) *Attorney, Agent, or Firm*—Panitch Schwarze Belisario & Nadel LLP

(57) ABSTRACT

A contactless integrated circuit is provided that includes a RFID communication interface, a UHF communication interface, a data processing unit, an interface multiplexer, a communication mode detection circuit, a first modulation and demodulation circuit, a second modulation and demodulation circuit, and a multiplexer demultiplexer circuit. The interface multiplexer couples the data processing unit to the RFID or UHF communication interfaces. The multiplexer demultiplexer circuits are driven by mode signals delivered by the communication mode detection circuit, to link the data processing unit to one of the two modulation and demodulation circuits.

27 Claims, 2 Drawing Sheets

RFID-UHF INTEGRATED CIRCUIT

CROSS-REFERENCE TO RELATED APPLICATIONS

This application is a continuation of International Application No. PCT/FR2003/002938, filed Oct. 7, 2003, which was published in the French language on Apr. 22, 2004, under International Publication No. WO 2004/034317 A2, and the disclosure of which is incorporated herein by reference.

BACKGROUND OF THE INVENTION

The present invention relates to contactless integrated circuits operating by inductive coupling and contactless integrated circuits operating by electric field coupling.

In recent years, contactless integrated circuits operating by inductive coupling, or RFID integrated circuits, have considerably developed. Table 1 below summarises the characteristics generally found and/or standardised for this type of contactless integrated circuit.

TABLE 1 main characteristics of RFID integrated circuits

Operating frequency: 13.56 MHz*
Magnetic field radiation: Wide
Data rate: 26, 106, 424, 847 Kbits/s
Clock signal extraction from the magnetic field: Yes
Electrical supply by induction (passive transponder): Yes
Read communication distance: up to 1 m
Write communication distance: up to 1 m
Operational/working conditions Water, rain: Yes
Dirt, dust: Yes
Hand carry: Yes
Human body compatible: Yes
Presence of metal tolerated: Yes if d > 2-3 cm**
Standards & accreditation Existing ISO standards: ISO 15693, ISO 14443
ISO standards under definition: —
USA accreditation: Yes, 3W***
Europe accreditation: Yes, 3W***
Japan accreditation: Yes, 3W***

*frequency of the magnetic field emitted by the integrated circuit scanner
**distance between the antenna of the integrated circuit and the metal object
***maximum power applied to the antenna circuit of the integrated circuit scanner UHF integrated circuits are also known, the operation of which is based on the principle of an electric field coupling, and the main characteristics whereof are summarised in table 2 below.

TABLE 2 main characteristics of UHF integrated circuits

Operating frequency: 433 MHz, 905 MHz, 2.45 GHz . . .
Electric field radiation: Narrow and highly directional
Data rate: 10-40 Kbits/s
Clock signal extraction from the electric field: No
Electrical supply by induction (passive transponder): Yes
Read communication distance: up to 4 m
Write communication distance: data write not provided
Operational/working conditions Water, rain: No
Dirt, dust: Yes
Hand carry: No TABLE 2-continued main characteristics of UHF integrated circuits Human body compatible: No
Presence of metal tolerated: No (reflections)
Standards & accreditation Existing ISO standards: —
ISO standards under definition: ISO 18000-6
USA accreditation: Yes, 1 W**
Europe accreditation: Yes, 500 mW**
Japan accreditation: No

*frequency of the electric field emitted by the integrated circuit scanner
**maximum power applied to the antenna circuit of the integrated circuit scanner One essential difference between RFID integrated circuits and UHF integrated circuits is that the latter cannot be carried by (or attached to) living beings (human beings, animals) and do not work in the presence of water or metal.

Furthermore, it is difficult to envisage writing data in passive-type UHF circuits (without any source of electrical power) since the electrical power that can be extracted from the UHF electric field is too low to generate a high voltage $V_{pp}$ for erasing and programming an EEPROM or a FLASH memory.

In reality, it is possible in theory to write data but with a very short communication distance, or by adding a voltage source such as an electric cell. Now, in most applications, it is not possible to consider incorporating a voltage source into a UHF electronic tag that enables the memory to be written without restricting the communication distance, both for reasons of encumbrance and cost price and for reasons of product service life, such that most UHF integrated circuits are of the passive type.

Furthermore, it is not possible to extract a clock signal from the UHF signal for technological reasons (frequency too high to be applied to a frequency divider) and the synchronisation of the data transfer requires the use of special coding of the data (synchronisation signal included in the coding of the bit).

On the other hand, UHF integrated circuits offer communication distances that are much greater than RFID integrated circuits (see tables above).

Finally, UHF integrated circuits offer a relatively small scope of application due to the various above-mentioned restrictions of use but are particularly well suited to logistics applications (product monitoring and traceability) due to their high communication distance.

But as their memory cannot be written in normal conditions of use, it is not possible to write traceability data (such as indications of product storage place and date, indications about transit, etc. for example).

BRIEF SUMMARY OF THE INVENTION

The present invention aims to provide a new type of integrated circuit that offers various advantages.

To that end, the present invention proposes a contactless integrated circuit comprising an RFID communication interface comprising an antenna coil for receiving a first induced alternating voltage when the integrated circuit is in the presence of an RF magnetic field, a data processing unit linked to the first communication interface, the data processing unit being equipped with an electrically programmable and erasable memory, a UHF communication interface comprising a UHF antenna for receiving a second induced alternating voltage when the integrated circuit is in the presence of a UHF electric field signal, and a multiplexing means for linking the data processing unit to one or other of the two communication interfaces.

Such an integrated circuit has various advantages. For example, data such as traceability data can be written to the memory via the RF communication interface and can be read later via the UHF communication interface. Moreover, assuming for example that such an integrated circuit is used to produce an electronic tag attached to objects transported to several countries in the world, the tag can be read via its UHF interface in the countries in which the traceability systems use UHF scanners and in the countries in which traceability systems use RFID scanners.

According to one embodiment, the integrated circuit comprises a first electrical supply circuit for extracting a first supply voltage from the first induced alternating voltage, a second electrical supply circuit for extracting a second supply voltage from the second induced alternating voltage, and a line for distributing an internal electrical supply voltage, linked on the one hand to the first electrical supply circuit and on the other hand to the second electrical supply circuit.

According to one embodiment, the integrated circuit comprises a communication mode detection circuit delivering a mode signal the value of which indicates which communication interface is active.

According to one embodiment, the integrated circuit comprises at least one switch means having a terminal linked to the distribution line and a terminal linked to the first or the second electrical supply circuit, and a circuit for controlling the switch means, arranged for closing the switch means when a supply voltage is present on the terminal of the switch means that is linked to the first or the second electrical supply circuit.

According to one embodiment, the control circuit is arranged for opening the switch means as a priority when the mode signal has a value corresponding to a communication mode in which an electric voltage is not present or should not be present on the terminal of the switch means that is linked to the first or the second electrical supply circuit.

According to one embodiment, the integrated circuit comprises a first clock generator arranged for extracting a first clock signal from the first induced voltage, by dividing the frequency of the first induced voltage, a second clock generator comprising an oscillator for delivering a second clock signal, and means for activating the second clock generator when the integrated circuit receives data through the UHF communication interface.

According to one embodiment, the second clock generator is powered through the distribution line and is activated by the mode signal when the latter has a determined value.

According to one embodiment, the integrated circuit comprises a multiplexer circuit driven by the mode signal, receiving the output of the first clock generator and the output of the second clock generator at input, and delivering an internal clock signal applied to the data processing unit.

According to one embodiment, the mode signal is applied to the data processing unit, the data processing unit is arranged for implementing at least one RFID data transmission protocol and a UHF data transmission protocol and for selecting one of the protocols according to the value of the mode signal.

According to one embodiment, the integrated circuit comprises a first modulation and demodulation circuit for sending and receiving data via the antenna coil, a second modulation and demodulation circuit for sending and receiving data via the UHF antenna, multiplexer and demultiplexer circuits driven by the mode signal, to link the data processing unit to one of the two modulation and demodulation circuits.

According to one embodiment, the mode detection circuit is arranged for detecting the first induced voltage at the terminals of the coil, and setting the mode signal to a determined value when the first induced voltage is detected.

According to one embodiment, the mode detection circuit comprises a detector of oscillations of the first induced voltage.

According to one embodiment, the mode detection circuit comprises a threshold detector of the first induced voltage.

According to one embodiment, the circuit for controlling the switch means comprises a booster circuit delivering a voltage for closing the switch means.

According to one embodiment, the booster circuit comprises a charge pump.

According to one embodiment, the switch means comprises a transistor having a threshold voltage.

According to one embodiment, the switch means is controlled by a logic gate electrically powered by the second supply voltage.

According to one embodiment, the integrated circuit is arranged on a portable medium and forms an electronic tag or a contactless smart card.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
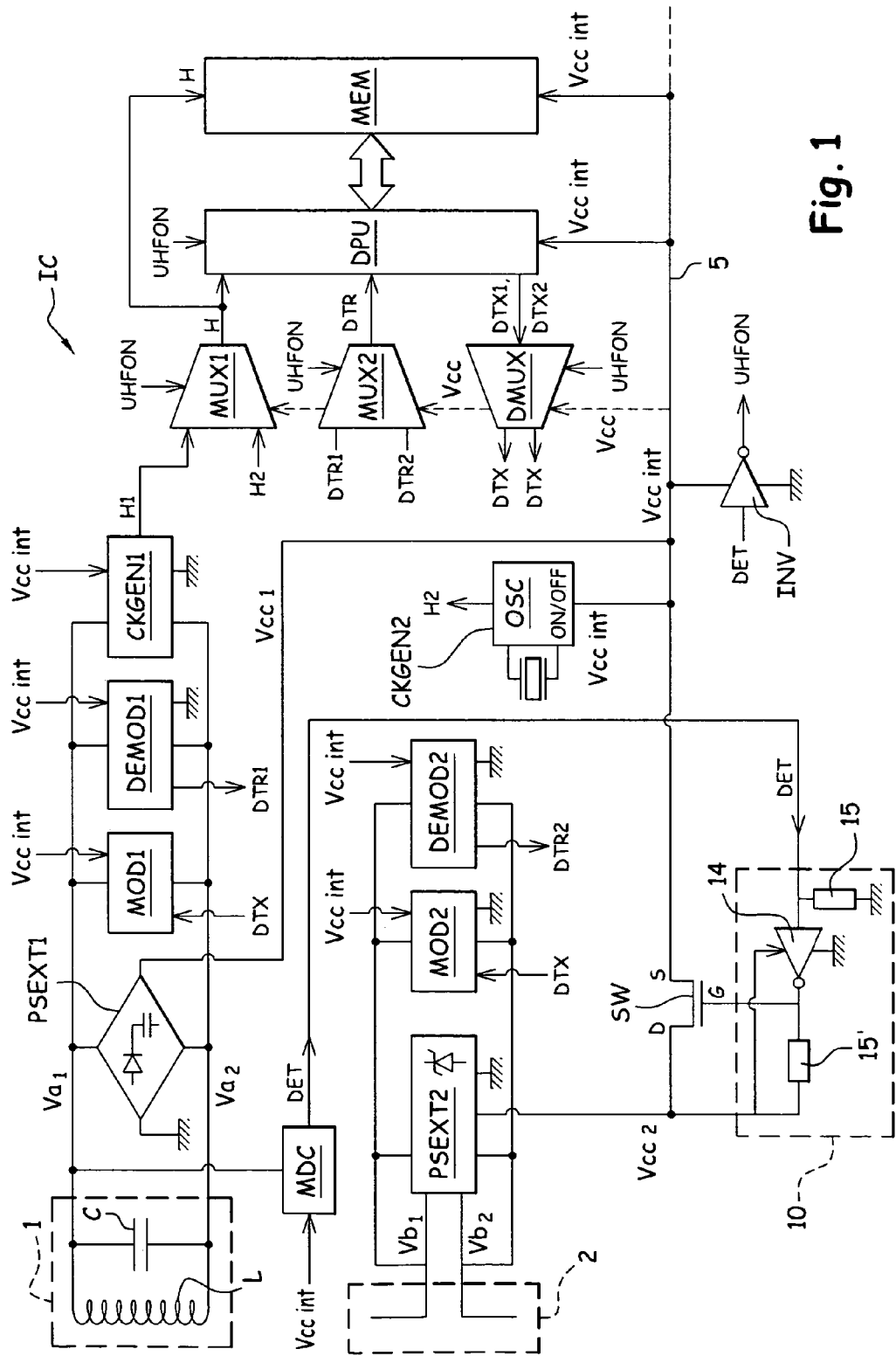
FIG. 1 is a block diagram schematic of an exemplary RFID-UHF circuit architecture according to the present invention.

FIG. 1 represents the architecture of an integrated circuit IC according to the present invention. The integrated circuit comprises a first analog interface comprising an RF antenna circuit referenced 1, an electrical supply circuit PSEXT1, a clock generator CKGEN1, a modulation circuit MOD1 and a demodulation circuit DEMOD1.

The antenna circuit 1 comprises at least one coil L and one tuning capacitor C, the assembly here being tuned to a resonance frequency in the order of 13.56 MHz. The coil L may comprise one or more windings, and may also comprise a first coil for receiving the electric energy and a second coil for transmitting the data.

The electrical supply circuit PSEXT1 is a diode rectifier that delivers a supply voltage Vcc1 using an induced alternating voltage Va of frequency 13.56 MHz. This voltage Va, which comprises a positive half-wave Va1 and a negative half-wave Va2, appears at the terminals of the antenna circuit 1 when the integrated circuit is plunged into an alternating magnetic field emitted by an RFID integrated circuit scanner.

The modulation circuit MOD1 receives data to be sent DTX and modulates the load of the antenna coil L according to these data. This modulation circuit may classically comprise a frequency divider receiving the voltage Va at input and delivering a load modulation sub-carrier which is combined with the data DTX to obtain a load modulation signal.

The demodulation circuit DEMOD1 extracts data DTR1 sent by an RFID integrated circuit scanner from the induced voltage Va, generally by modulating the amplitude of the ambient magnetic field, and delivers data received DTR1.

The clock generator CKGEN1 classically comprises frequency dividers for delivering, using the induced voltage Va oscillating at 13.56 MHz, a clock signal H1 of lower frequency.

The integrated circuit according to the present invention also comprises a second analog interface comprising a UHF antenna circuit referenced 2, an electrical supply circuit PSEXT2, a clock generator CKGEN2, a modulation circuit MOD2 and a demodulation circuit DEMOD2.

The antenna circuit 2 is a classical UHF dipole wire antenna, here provided for receiving an electric field signal oscillating at a determined frequency, typically 433 MHz, 905 MHz, 2.45 GHz... This dipole antenna classically comprises two wires each of length lambda/4 (i.e. a total length of lambda/2), lambda being the wavelength of the electric field signal.

The electrical supply circuit PSEXT2 delivers a supply voltage Vcc2 extracted from an induced alternating voltage Vb (Vb1, Vb2) that appears at the terminals of the wire antenna 2 when the integrated circuit is in the presence of an electric field emitted by a UHF integrated circuit scanner.

The modulation circuit MOD2 receives data to be sent DTX and modulates the load of the wire antenna 2 according to the data DTX. This modulation circuit may classically comprise a frequency divider for delivering a load modulation sub-carrier which is combined with the data DTX to obtain a load modulation signal.

The demodulation circuit DEMOD2 extracts data sent by a scanner from the induced voltage Vb, by modulating the amplitude of the electric field signal, and delivers data received DTR2.

The clock generator CKGEN2 comprises a quartz oscillator OSC delivering a clock signal H2. The oscillator OSC comprises an ON/OFF (activation/deactivation) input, and receives a mode signal UHFON at this input.

The integrated circuit according to the present invention also comprises a mode detection circuit MDC that delivers a detection signal DET. The signal DET is applied to an inverting gate INV the output of which delivers the mode signal UHFON. The circuit MDC is here arranged for detecting the presence of the alternating voltage Va at the terminals of the coil L of the antenna circuit 1, such as the presence of a half-wave Va1 on a terminal of the coil for example. By convention, the signal DET is on 1 and the signal UHFON is on 0 when the alternating voltage Va is present on the coil L. In the opposite case, the signal DET is on 0 and the signal UHFON on 1.

The integrated circuit according to the present invention also comprises a data processing unit DPU (hard-wired logic sequencer or microprocessor), a memory MEM comprising EEPROM- or FLASH-type electrically programmable and erasable areas, which is combined with the DPU, as well as multiplexers MUX1, MUX2 and a demultiplexer DMUX.

The DPU receives the mode signal UHFON at one input. The DPU is programmed to code data to be sent DTX1 and decode data received DTR according to a coding/decoding protocol provided for RFID integrated circuits when the mode signal UHFON is equal to 0. The DPU is also programmed to code data to be sent DTX2 and decode data received DTR according to a coding/decoding protocol provided for UHF integrated circuits when the mode signal UHFON is equal to 1.

The multiplexer MUX1 receives the clock signal H1 delivered by the generator-extractor CKGEN1 at a first input and receives the clock signal H2 delivered by the generator-oscillator CKGEN2 at a second input. The multiplexer MUX1 is driven by the mode signal UHFON and delivers an internal clock signal H, which is applied to the DPU and to the memory MEM. Depending on the value of the mode signal UHFON, 0 or 1, the internal clock signal H is equal to the signal H1 or to the signal H2.

The multiplexer MUX2 receives data DTR1 delivered by the demodulator DEMOD1 at a first input and receives data DTR2 delivered by the demodulator DEMOD2 at a second input. The multiplexer MUX2 is driven by the mode signal UKFON and delivers data DTR to the DPU for decoding and processing. Depending on the value of the mode signal UHFON, 0 or 1, the data DTR are the data DTR1 or the data DTR2.

The demultiplexer DMUX is driven by the mode signal UHFON and receives data DTX delivered by the processing unit DPU at a single input. Depending on the value of the mode signal UHFON, the demultiplexer DMUX delivers these data to a first output that is linked to the input of the modulator MOD1 or to a second output that is linked to the input of the modulator MOD2.

The integrated circuit according to the present invention also comprises a power supply management system comprising a distribution line 5 for distributing an internal supply voltage Vccint, a switch SW and a circuit 10 for controlling the switch SW. The output of the supply circuit PSEXT2 is linked to the distribution line 5 through the switch SW while the output of the supply circuit PSEXT1 is linked directly to the distribution line 5. The control circuit 10 receives the voltage Vcc2 at a first input and the signal DET at a second input. The clock generator CKGEN2 is here powered by the voltage Vccint, along with the elements MOD1, MOD2, DEMOD1, DEMOD2, CKGEN, DPU, MEM.

In one alternative embodiment, a reverse arrangement of the switch SW could be chosen, by disposing the switch SW at the output of the circuit PSEXT1.

The integrated circuit according to the present invention has two main operating modes, i.e. the RFID mode and the UHF mode.

In RFID mode, the integrated circuit receives the supply voltage Vcc1 delivered by the circuit PSEXT1 and the signal UHFON is on 0. The generator CKGEN2 is inactive (OFF) and the generator CKGEN1 delivers the clock signal H1. The voltage Vcc1 is present on the distribution line 5 and thus forms the voltage Vccint. The data received DTR1 (data or commands) delivered by the circuit DEMOD1 are applied to the DPU via the multiplexer MUX2 for decoding and execution (commands) and, possibly, recording in the memory MEM (data). The data to be sent DTX delivered by the DPU are applied to the circuit MOD1 via the demultiplexer DMUX.

In UHF mode, the integrated circuit receives the supply voltage Vcc2 delivered by the circuit PSEXT2 and the signal UHFON is on 1. The generator CKGEN2 delivers the clock signal H2. The voltage Vcc2 is present on the distribution line 5 and thus forms the voltage Vccint. The data received DTR2 (data or commands) delivered by the circuit DEMOD2 are applied to the DPU via the multiplexer MUX2 for decoding and execution (commands). As indicated above, the recording of data in the memory MEM is not envisaged in UHF mode, as the energy extracted via the UHF antenna circuit is too low to produce a voltage Vpp for programming or erasing the erasable and programmable areas of the memory MEM. The data to be sent DTX delivered by the DPU are applied to the circuit MOD1 via the demultiplexer DMUX.

The operation of the control circuit 10 is as follows:
1) when the voltage Vcc2 is not zero and the signal DET is on 0 (no voltage Va on the coil L), the control circuit 10 closes the switch SW such that the voltage Vcc2 is present on the distribution line 5.
2) when the signal DET is on 1 (detection of the voltage Va on the coil L), the control circuit 10 opens the switch SW as a priority, whether the voltage Vcc2 is zero or not, such that only the voltage Vcc1 resulting from the rectification of the voltage Va is present on the distribution line 5.

A third case is the one in which the voltage Vcc2 is zero and the signal DET is on 0. As neither of the two voltages Vcc1 or Vcc2 is present, the state of the switch SW is not important and it will generally be closed for want of power supply.

Thus, when the voltages Vcc1 and Vcc2 are not zero, the control circuit 10 here gives priority to the voltage Vcc1 by opening the switch SW. The control circuit 10 enables any conflicts between the voltages Vcc1, Vcc2 to be managed, in the presence of an RFID-type scanner and a UHF-type scanner for example. Such a situation can for example occur in a product management centre provided for scanning various types of electronic tags.

An opposite choice can be provided but the fact of choosing the RFID mode as priority mode provides the advantage of enabling data to be written to the memory MEM.

The control circuit 10 only intervenes upon power on. Once the supply voltage has stabilised, the state of the control circuit 10 can be latched by any means, for example by means of the classical POR (Power On Reset) signal.

The discrimination of the RFID mode and the UHF mode by directly detecting the voltage Va on the coil L enables the signals DET and UHFON to be rapidly delivered from the moment the coil L is in the presence of an inductive magnetic field. However, it remains possible to base the mode discrimination on a detection of the voltage Vcc1 or the voltage Vcc2.

In FIG. 1, the switch SW is an NMOS transistor the drain D of which is connected to the output of the circuit PSEXT2 and the source S connected to the distribution line 5. The control circuit 10 comprises an inverting gate 14 receiving the signal DET at input and the output of which drives the gate G of the transistor SW. To close the transistor SW when the voltage Vcc2 appears (i.e. before the voltage Vcc2 is present on the distribution line 5), the supply terminal of the inverting gate 14 is connected to the output of the circuit PSEXT2 and directly receives the voltage Vcc2. The input of the inverting gate 14 is connected to the ground through a stabilisation resistor 15 of high value so as to be maintained on 0 in the absence of the signal DET. In place of the resistor 15, a resistor 15' can also be disposed between the output of the gate 14 and the voltage Vcc2.

If by reverse convention the signal DET must be on 0 instead of being on 1 when the voltage Va is detected on the coil L, another inverting gate is added in series with the gate 14.

With this embodiment of the control circuit 10, the voltage Vccint present on the distribution line 5 is substantially lower than the voltage Vcc2 due to the threshold voltage VT of the transistor SW (in the order of 1 volt for a MOS transistor). Such a loss of voltage may not be desirable in certain applications, since it limits the maximum distance of communication with a UHF scanner.

Figure 2:
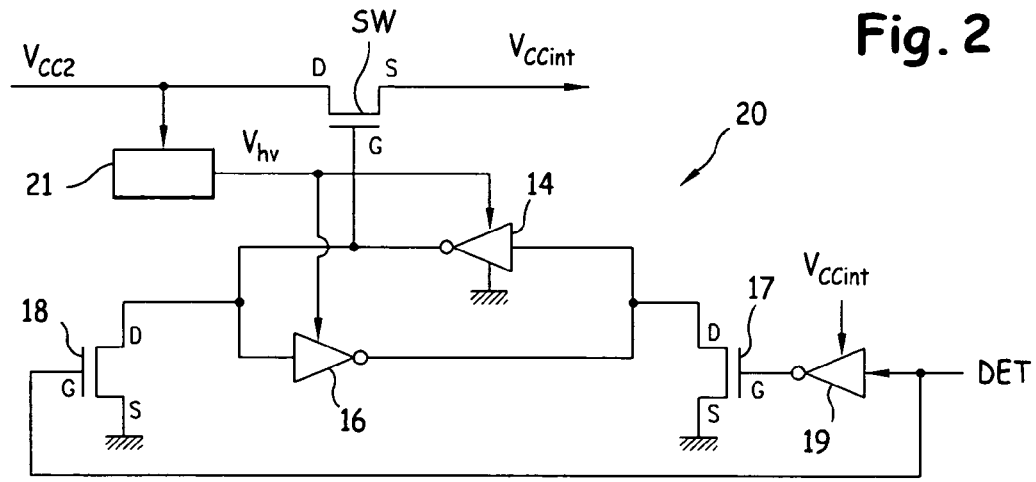
FIG. 2 is an electrical schematic diagram of one alternative embodiment of a control circuit represented in FIG. 1.

FIG. 2 represents an embodiment of the control circuit 20 which overcomes this disadvantage. The control circuit 20 comprises a booster circuit 21 powered by the voltage Vcc2, produced for example by means of a charge pump. The output of the circuit 21 delivers a boosted voltage Vhv. Preferably, the voltage Vhv is at least equal to [Vcc2+VT] to offset the threshold voltage VT of the transistor SW. The voltage Vhv is applied to the supply terminal of the inverting gate 14 the logic level "1" of which thus becomes equal to Vhv. Furthermore, the control circuit 20 is designed to isolate the voltage Vhv in relation to the voltage Vccint, which represents the logic level "1" of the signal DET. To that end, the output of the inverting gate 14 drives the input of another inverting gate 16 the output of which is brought back to the input of the gate 14, the assembly forming a "latch". Each of the inputs of the gates 14 and 16 is connected to the drain D of an NMOS transistor of reference 17, respectively 18, the source S of which is connected to the ground. The gate G of the transistor 18 is controlled by the signal DET and that of the transistor 17 by a signal that is the opposite of the signal DET, delivered by an inverting gate 19.

The control circuit 20 operates like an inverting gate. When the signal DET is on 0 the output of the gate 19 is on 1 and the transistor 17 is on. When it is on, the transistor 17 sets the input of the gate 14 to 0. The output of the gate 14 then delivers the voltage Vhv (logic 1) to the gate G of the transistor SW.

Figure 3:
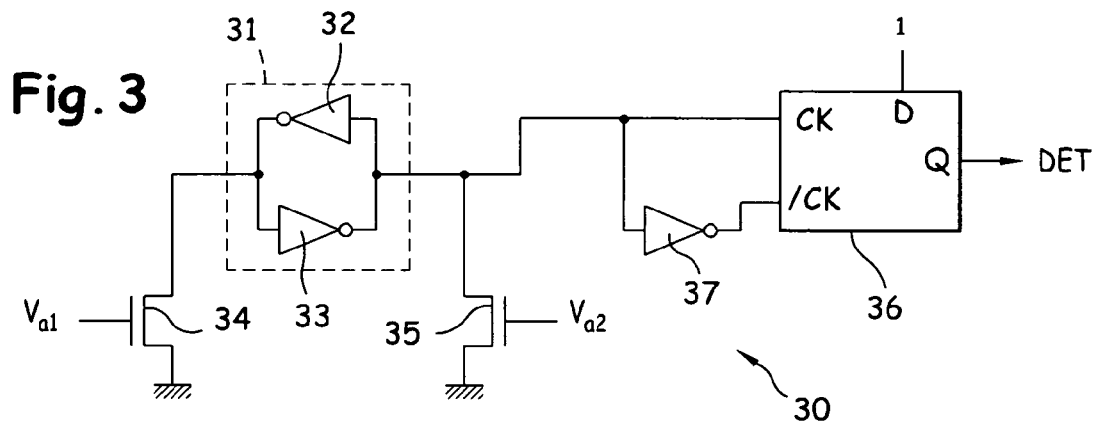
FIGS. 3 and 4 are electrical schematic diagrams of two alternative embodiments of the induced voltage detector.

FIG. 3 represents an example of an embodiment of the detection circuit MDC in the form of an oscillation detector 30. The detector 30 comprises a latch 31 formed by two inverting gates 32, 33 arranged head-to-tail, the input and the output of which can be set to 0 by two MOS transistors 34, 35 respectively driven by the positive Va1 and negative Va2 half-waves of the voltage Va. A D flip-flop 36 having two complementary clock inputs CK and /CK, is connected by the input CK to the two-way gate 31, the input CK being brought back to the input /CK through an inverting gate 37. The D input of the flip-flop 36 is maintained on 1 (Vccint) and the Q output delivers the signal DET. When an oscillation appears at the terminals of the coil L, the transistors 34 and 35 are put into transmission state one after the other. The D flip-flop first of all sees a rising edge at its input CK then a rising edge at its input /CK. The Q output then copies the D input and the signal DET changes to 1.

As indicated above, the state of the control circuit 10 or 20 can be latched once the supply voltage Vcc1 or Vcc2 is stabilised. The signal DET can for example be latched by means of a second D flip-flop receiving the signal DET at its D input and, at its clock input, the classical signal POR appearing upon power on.

The switching of the oscillation detector 30 that has just been described is rapid since a single complete oscillation of the voltage Va (i.e. two half-waves Va1 and Va2) is sufficient to change the signal DET to 1.

Figure 4:
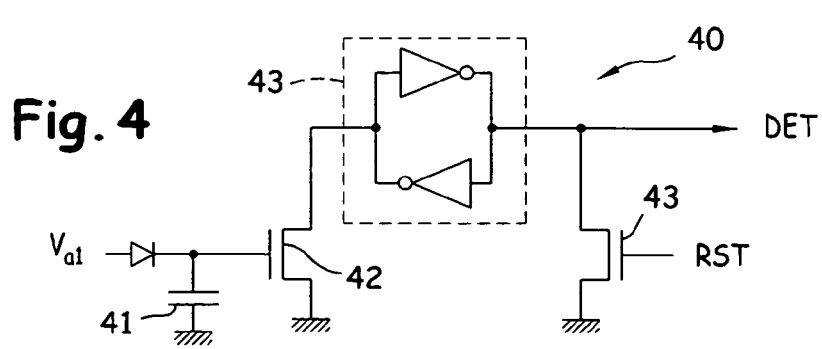

FIG. 4 represents another embodiment of the detection circuit MDC, in the form of a threshold detector 40. Although it is slower to trigger, this circuit 40 can also be used. A half-wave of the voltage Va, such as Va1 for example, is applied to a low-value capacitor 41 through a diode. The capacitor 41 drives the gate of an NMOS transistor 42. The transistor 42 is connected between the ground and the input of a latch 43 the output of which delivers the signal DET. When the load of the capacitor 41 reaches the threshold voltage VT of the transistor 42, the transistor 42 becomes on and sets the input of the latch 43 to 0, the output DET of which changes to 1. A reset transistor 43, driven by a signal RST, can be provided at the output of the latch 43.

In practice, the switch SW may comprise several transistors, for example a PMOS transistor in parallel with an NMOS transistor, or it may comprise any other switch means. Various alternative embodiments and improvements of the present invention may be made, as far as the control circuit of the switch, the power supply management system, the detector of the alternating voltage at the terminals of the coil, the generation of the mode signal, etc. are concerned.

The power supply management system that has just been described comprises a minimum amount of elements required to achieve the desired result at a minimum cost and with little encumbrance on the silicon surface of an integrated circuit. However, other switch means can be provided, such as a switch disposed between the output of the circuit PSEXT1 and the distribution line 5. This other switch can also be controlled by a booster circuit so as not to reduce the perimeter of contactless communication between the integrated circuit and an RFID scanner. This additional switch can for example be closed when the voltage Vcc1 appears, and open in the other cases.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A contactless integrated circuit comprising:
    a radiofrequency identification (RFID) communication interface comprising an antenna coil that receives a first induced alternating voltage when the integrated circuit is in the presence of a radiofrequency magnetic field,
    an ultrahigh frequency (UHF) communication interface comprising a UHF antenna that receives a second induced alternating voltage when the contactless integrated circuit is in the presence of a UHF electric field signal,
    a data processing unit equipped with an electrically programmable and erasable memory,
    an interface multiplexer that couples the data processing unit to the RFID communication interface or the UHF communication interface,
    a communication mode detection circuit that delivers a mode signal, the value of which indicates which communication interface is active,
    a first modulation and demodulation circuit that sends and receives data via the antenna coil,
    a second modulation and demodulation circuit that sends and receives data via the UHF antenna, and
    multiplexer and demultiplexer circuits driven by the mode signal to link the data processing unit to one of the two modulation and demodulation circuits.

2. The contactless integrated circuit according to claim 1, comprising:
    a first electrical supply circuit that extracts a first supply voltage from the first induced alternating voltage,
    a second electrical supply circuit that extracts a second supply voltage from the second induced alternating voltage,
    a line that distributes an internal electrical supply voltage, the line being coupled to the first electrical supply circuit and to the second electrical supply circuit.

3. The contactless integrated circuit according to claim 2, further comprising:
    at least one switch having a terminal coupled to the distribution line and a terminal coupled to the first or the second electrical supply circuit, and
    a circuit that controls the switch and that is configured to close the switch when a supply voltage is present on the terminal coupled to the first or the second electrical supply circuit.

4. The contactless integrated circuit according to claim 3, wherein the control circuit is configured to open the switch as a priority when the mode signal has a value corresponding to a communication mode in which an electric voltage is not present or should not be present on the terminal coupled to the first or the second electrical supply circuit.

5. The contactless integrated circuit according to claim 1, wherein the mode signal is applied to the data processing unit, the data processing unit is configured to implement at least one RFJD data transmission protocol and a UHF data transmission protocol and to select one of the UHF and RFID protocols according to the value of the mode signal.

6. The contactless integrated circuit according to claim 1, wherein the communication mode detection circuit is configured to detect the first induced voltage at the terminals of the coil and to set the mode signal to a determined value when the first induced voltage is detected.

7. The contactless integrated circuit according to claim 1, wherein the communication mode detection circuit comprises a detector of oscillations of the first induced voltage.

8. The contactless integrated circuit according to claim 3, wherein the circuit that controls the switch comprises a booster circuit delivering a voltage that closes the switch.

9. The contactless integrated circuit according to claim 1, wherein the contactless integrated circuit is arranged on a portable medium and forms one of an electronic tag and a contactless smart card.

10. A contactless integrated circuit comprising:
    a radiofrequency identification (RFID) communication interface comprising an antenna coil that receives a first induced alternating voltage when the integrated circuit is in the presence of a radiofrequency magnetic field,
    an ultrahigh frequency (UHF) communication interface comprising a UHF antenna that receives a second induced alternating voltage when the contactless integrated circuit is in the presence of a UHF electric field signal,
    a data processing unit equipped with an electrically programmable and erasable memory,
    an interface multiplexer that couples the data processing unit to the RFID communication interface or the UHF communication interface,
    a distribution line that distributes an internal electrical supply voltage,
    a communication mode detection circuit that delivers a mode signal, the value of which indicates which communication interface is active,
    a first clock generator configured to extract a first clock signal from the first induced voltage, by dividing the frequency of the first induced voltage,
    a second clock generator comprising an oscillator that delivers a second clock signal, and
    a circuit that activates the second clock generator when the contactless integrated circuit receives data through the UHF communication interface,
    wherein the second clock generator is powered through the distribution line and is activated by the mode signal when the mode signal has a determined value.

11. The contactless integrated circuit according to claim 10, further comprising:
   a first electrical supply circuit that extracts a first supply voltage from the first induced alternating voltage,
   a second electrical supply circuit that extracts a second supply voltage from the second induced alternating voltage, and
   wherein the distribution line is coupled to the first electrical supply circuit and to the second electrical supply circuit.

12. The contactless integrated circuit according to claim 10, further comprising:
   at least one switch having a terminal coupled to the distribution line and a terminal coupled to the first or the second electrical supply circuit, and
   a circuit that controls the switch and that is configured to close the switch when a supply voltage is present on the terminal coupled to the first or the second electrical supply circuit.

13. The contactless integrated circuit according to claim 12, wherein the control circuit is configured to open the switch as a priority when the mode signal has a value corresponding to a communication mode in which an electric voltage is not present or should not be present on the terminal coupled to the first or the second electrical supply circuit.

14. The contactless integrated circuit according to claim 10, wherein the mode signal is applied to the data processing unit, the data processing unit is configured to implement at least one RFID data transmission protocol and a UHF data transmission protocol and to select one of the UHF and RFID protocols according to the value of the mode signal.

15. The contactless integrated circuit according to claim 10, wherein the communication mode detection circuit is configured to detect the first induced voltage at the terminals of the coil and to set the mode signal to a determined value when the first induced voltage is detected.

16. The contactless integrated circuit according to claim 10, wherein the communication mode detection circuit comprises a detector of oscillations of the first induced voltage.

17. The contactless integrated circuit according to claim 10, wherein the communication mode detection circuit comprises a threshold detector to detect a threshold of the first induced voltage.

18. The contactless integrated circuit according to claim 10, wherein the contactless integrated circuit is arranged on a portable medium and forms one of an electronic tag and a contactless smart card.

19. A contactless integrated circuit comprising:
   a radiofrequency identification (RFID) communication interface comprising an antenna coil that receives a first induced alternating voltage when the integrated circuit is in the presence of a radiofrequency magnetic field,
   an ultrahigh frequency (UHF) communication interface comprising a UHF antenna that receives a second induced alternating voltage when the contactless integrated circuit is in the presence of a UHF electric field signal,
   a data processing unit equipped with an electrically programmable and erasable memory,
   an interface multiplexer that couples the data processing unit to the RFID communication interface or the UHF communication interface,
   a communication mode detection circuit that delivers a mode signal, the value of which indicates which communication interface is active,
   a first clock generator configured to extract a first clock signal from the first induced voltage, by dividing the frequency of the first induced voltage,
   a second clock generator comprising an oscillator that delivers a second clock signal,
   a circuit that activates the second clock generator when the contactless integrated circuit receives data through the UHF communication interface, and
   a multiplexer circuit driven by the mode signal, the multiplexer receiving the output of the first clock generator and the output of the second clock generator at input and delivering an internal clock signal applied to the data processing unit.

20. The contactless integrated circuit according to claim 19, further comprising:
   a first electrical supply circuit that extracts a first supply voltage from the first induced alternating voltage,
   a second electrical supply circuit that extracts a second supply voltage from the second induced alternating voltage, and
   a line that distributes an internal electrical supply voltage, the line being coupled to the first electrical supply circuit and to the second electrical supply circuit.

21. The contactless integrated circuit according to claim 19, further comprising:
   at least one switch having a terminal coupled to the distribution line and a terminal coupled to the first or the second electrical supply circuit, and
   a circuit that controls the switch and that is configured to close the switch when a supply voltage is present on the terminal coupled to the first or the second electrical supply circuit.

22. The contactless integrated circuit according to claim 21, wherein the control circuit is configured to open the switch as a priority when the mode signal has a value corresponding to a communication mode in which an electric voltage is not present or should not be present on the terminal coupled to the first or the second electrical supply circuit.

23. The contactless integrated circuit according to claim 19, wherein the mode signal is applied to the data processing unit, the data processing unit is configured to implement at least one RFID data transmission protocol and a UHF data transmission protocol and to select one of the UHF and RFID protocols according to the value of the mode signal.

24. The contactless integrated circuit according to claim 19, wherein the communication mode detection circuit is configured to detect the first induced voltage at the terminals of the coil and to set the mode signal to a determined value when the first induced voltage is detected.

25. The contactless integrated circuit according to claim 19, wherein the communication mode detection circuit comprises a detector of oscillations of the first induced voltage.

26. The contactless integrated circuit according to claim 19, wherein the communication mode detection circuit comprises a threshold detector to detect a threshold of the first induced voltage.

27. The contactless integrated circuit according to claim 19, wherein the contactless integrated circuit is arranged on a portable medium and forms one of an electronic tag and a contactless smart card.

* * * * *